United States Patent
Wagner

(10) Patent No.: US 8,868,987 B2
(45) Date of Patent: Oct. 21, 2014

(54) SYSTEMS AND METHODS FOR VISUAL CORRELATION OF LOG EVENTS, CONFIGURATION CHANGES AND CONDITIONS PRODUCING ALERTS IN A VIRTUAL INFRASTRUCTURE

(75) Inventor: Andrew Wagner, Portland, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 12/701,491

(22) Filed: Feb. 5, 2010

(65) Prior Publication Data

US 2011/0197094 A1    Aug. 11, 2011

(51) Int. Cl.
*G06F 11/00* (2006.01)
*G06F 11/30* (2006.01)
*G06F 11/32* (2006.01)
*G06F 9/44* (2006.01)

(52) U.S. Cl.
CPC ............ *G06F 11/328* (2013.01); *G06F 11/301* (2013.01); *G06F 11/3082* (2013.01); *G06F 11/3051* (2013.01); *G06F 8/71* (2013.01)
USPC .................................................. 714/57

(58) Field of Classification Search
USPC ........................... 714/57, 4.1, 47.1
See application file for complete search history.

(56) References Cited

U.S. PATENT DOCUMENTS

| | | | |
|---|---|---|---|
| 5,493,729 A | 2/1996 | Nigawara et al. | |
| 5,828,830 A * | 10/1998 | Rangaraian et al. | 714/48 |
| 6,006,016 A | 12/1999 | Faigon et al. | |
| 6,112,225 A | 8/2000 | Kraft et al. | |
| 6,182,119 B1 * | 1/2001 | Chu | 709/206 |
| 6,182,249 B1 * | 1/2001 | Wookey et al. | 714/47.2 |
| 6,282,175 B1 * | 8/2001 | Steele et al. | 370/254 |
| 6,629,106 B1 | 9/2003 | Narayanaswamy et al. | |
| 6,938,081 B1 | 8/2005 | Mir | |
| 6,941,557 B1 | 9/2005 | Jakobson et al. | |
| 7,028,228 B1 * | 4/2006 | Lovy et al. | 714/57 |
| 7,243,348 B2 | 7/2007 | Good et al. | |
| 7,287,193 B2 * | 10/2007 | Ward | 714/43 |
| 7,316,016 B2 | 1/2008 | DiFalco | |
| 7,337,090 B1 | 2/2008 | Yemini et al. | |
| 7,360,099 B2 | 4/2008 | DiFalco et al. | |
| 7,469,287 B1 | 12/2008 | Castillo et al. | |
| 7,490,322 B2 | 2/2009 | Pichetti et al. | |
| 7,587,754 B2 | 9/2009 | DiFalco et al. | |
| 7,620,715 B2 | 11/2009 | DiFalco et al. | |
| 7,711,703 B2 | 5/2010 | Smolen et al. | |
| 7,711,980 B1 * | 5/2010 | Scarpello et al. | 714/4.1 |
| 7,765,460 B2 | 7/2010 | DiFalco et al. | |
| 7,822,724 B2 | 10/2010 | DiFalco et al. | |
| 7,860,222 B1 | 12/2010 | Sidler et al. | |
| 8,031,634 B1 | 10/2011 | Artzi et al. | |
| 8,140,635 B2 | 3/2012 | DiFalco | |
| 8,140,919 B2 * | 3/2012 | Glaser et al. | 714/57 |
| 8,176,158 B2 | 5/2012 | DiFalco et al. | |
| 8,364,639 B1 | 1/2013 | Koryakina et al. | |
| 2002/0078382 A1 | 6/2002 | Sheikh et al. | |
| 2002/0112078 A1 | 8/2002 | Yach | |
| 2003/0037089 A1 | 2/2003 | Cota-Robles et al. | |
| 2004/0024843 A1 | 2/2004 | Smith | |
| 2004/0122962 A1 | 6/2004 | DiFalco et al. | |
| 2004/0128670 A1 | 7/2004 | Robinson et al. | |

(Continued)

*Primary Examiner* — Philip Guyton
(74) *Attorney, Agent, or Firm* — Klarquist Sparkman, LLP

(57) ABSTRACT

Embodiments of the present disclosure provide methods and systems for detecting and correlating log events, configuration changes and conditions producing alerts within a virtual infrastructure. Other embodiments may be described and claimed.

12 Claims, 6 Drawing Sheets

(56) References Cited

U.S. PATENT DOCUMENTS

| | | |
|---|---|---|
| 2005/0050068 A1 | 3/2005 | Vaschillo et al. |
| 2005/0137832 A1 | 6/2005 | Yemini et al. |
| 2006/0041659 A1 | 2/2006 | Hasan et al. |
| 2006/0161879 A1 | 7/2006 | Lubrecht et al. |
| 2006/0242277 A1 | 10/2006 | Torrence et al. |
| 2006/0262915 A1 | 11/2006 | Marascio et al. |
| 2007/0028237 A1 | 2/2007 | Bulson et al. |
| 2007/0043786 A1 | 2/2007 | DiFalco et al. |
| 2007/0043860 A1* | 2/2007 | Pabari ............................ 709/224 |
| 2007/0124255 A1 | 5/2007 | DiFalco et al. |
| 2007/0130566 A1 | 6/2007 | van Rietschote et al. |
| 2007/0174449 A1 | 7/2007 | Gupta |
| 2007/0283348 A1 | 12/2007 | White |
| 2007/0299882 A1 | 12/2007 | Padgett et al. |
| 2007/0300218 A1 | 12/2007 | Mann |
| 2008/0114581 A1 | 5/2008 | Meir et al. |
| 2008/0114874 A1 | 5/2008 | Meir et al. |
| 2008/0134050 A1 | 6/2008 | Franceschelli et al. |
| 2008/0134175 A1 | 6/2008 | Fitzgerald et al. |
| 2008/0163207 A1 | 7/2008 | Reumann et al. |
| 2008/0163211 A1 | 7/2008 | Mizuno |
| 2008/0178249 A1 | 7/2008 | Gordon et al. |
| 2008/0222375 A1* | 9/2008 | Kotsovinos et al. .......... 711/162 |
| 2009/0037492 A1 | 2/2009 | Baitalmal et al. |
| 2009/0094336 A1 | 4/2009 | Echevarria et al. |
| 2009/0094584 A1 | 4/2009 | Dheap et al. |
| 2009/0138541 A1 | 5/2009 | Wing et al. |
| 2009/0177710 A1 | 7/2009 | Holenstein et al. |
| 2009/0199177 A1* | 8/2009 | Edwards et al. .................. 718/1 |
| 2009/0287818 A1 | 11/2009 | Tachibana et al. |
| 2009/0292948 A1 | 11/2009 | Cinato et al. |
| 2009/0300578 A1 | 12/2009 | Neil |
| 2010/0005107 A1 | 1/2010 | DiFalco |
| 2010/0017519 A1 | 1/2010 | Han et al. |
| 2010/0023612 A1 | 1/2010 | Yoshida et al. |
| 2010/0049929 A1 | 2/2010 | Nagarkar |
| 2010/0100955 A1 | 4/2010 | Young et al. |
| 2010/0175063 A1 | 7/2010 | Ciano et al. |
| 2010/0191887 A1 | 7/2010 | Serebrin |
| 2010/0242045 A1* | 9/2010 | Swamy et al. ................ 718/104 |
| 2010/0275199 A1 | 10/2010 | Smith et al. |
| 2011/0004914 A1* | 1/2011 | Ennis et al. ....................... 726/1 |
| 2011/0032260 A1* | 2/2011 | Duggan et al. ................ 345/440 |
| 2011/0055385 A1 | 3/2011 | Tung et al. |
| 2011/0119670 A1 | 5/2011 | Sugumar et al. |
| 2011/0137905 A1 | 6/2011 | Good et al. |
| 2011/0138038 A1 | 6/2011 | Good et al. |
| 2011/0138039 A1 | 6/2011 | Good et al. |
| 2011/0197189 A1 | 8/2011 | Wagner et al. |
| 2011/0197205 A1 | 8/2011 | Wagner et al. |
| 2012/0023076 A1 | 1/2012 | Torrence et al. |
| 2012/0137293 A1 | 5/2012 | Bozek et al. |
| 2012/0179805 A1 | 7/2012 | DiFalco |

\* cited by examiner

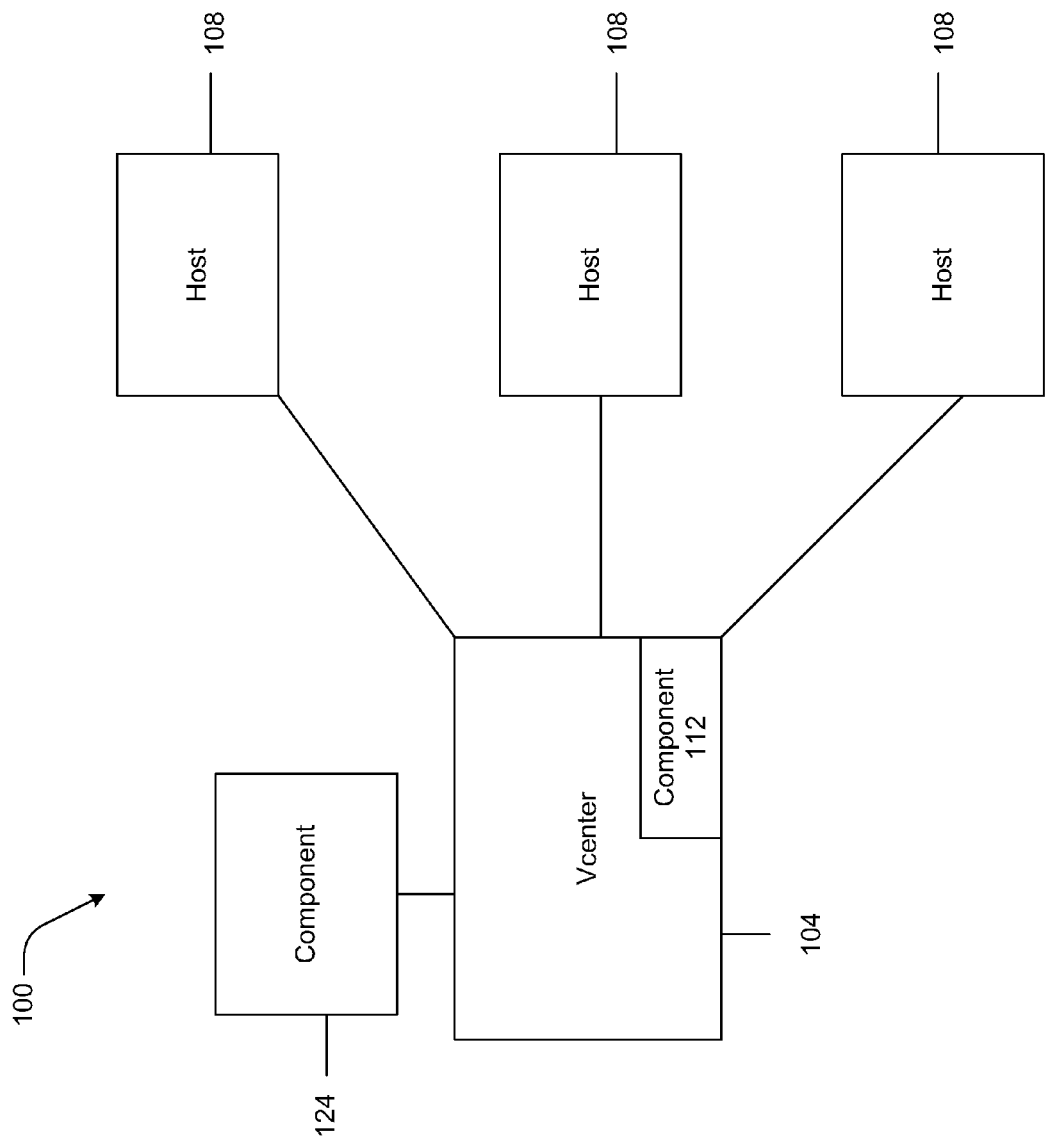

SYSTEMS AND METHODS FOR VISUAL CORRELATION OF LOG EVENTS, CONFIGURATION CHANGES AND CONDITIONS PRODUCING ALERTS IN A VIRTUAL INFRASTRUCTURE

TECHNICAL FIELD

Embodiments of the present disclosure relate to the field of data processing, and more particularly, to detecting and correlating log events, configuration changes and conditions producing alerts within a virtual infrastructure.

BACKGROUND

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring a special conditioned environment to operate. At the same time, special purpose computing devices such as personal digital assistants, media players, wireless mobile phones are common. Further, advances in networking, telecommunication, satellite, and other related technologies have also led to increase in connectivity between computing devices, making possible networked computing over private and/or public networks, such as the Internet.

However, as networked computing continues to grow in sophistication, enterprise networks become increasingly complex. Many networks are now partitioned to include one or more virtual infrastructures. VMware® software, available from VMware®, Inc., may be used to provide the one or more virtual infrastructures and provides a completely virtualized set of hardware to a guest operating system. VMware® software virtualizes the hardware for a video adapter, a network adapter, and hard disk adapters. The host provides pass-through drivers for guest USB, serial, and parallel devices. In this way, VMware® virtual machines become highly portable between computers, because the guests have no knowledge of the host on which they are running. In practice, a system administrator can pause operations on a virtual machine guest, move or copy that guest to another physical computer, and there resume execution exactly at the point of suspension. Alternately, for enterprise servers, a feature called VMotion allows the migration of operational guest virtual machines between similar but separate hardware hosts sharing the same storage. Each of these transitions is completely transparent to any users on the virtual machine at the time it is being migrated.

From configuration, application service provision, change management, to network protection, enterprises currently face many challenges.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

FIG. 1A schematically illustrates a network configured with a virtual infrastructure.

DETAILED DESCRIPTION

Figure 1B:
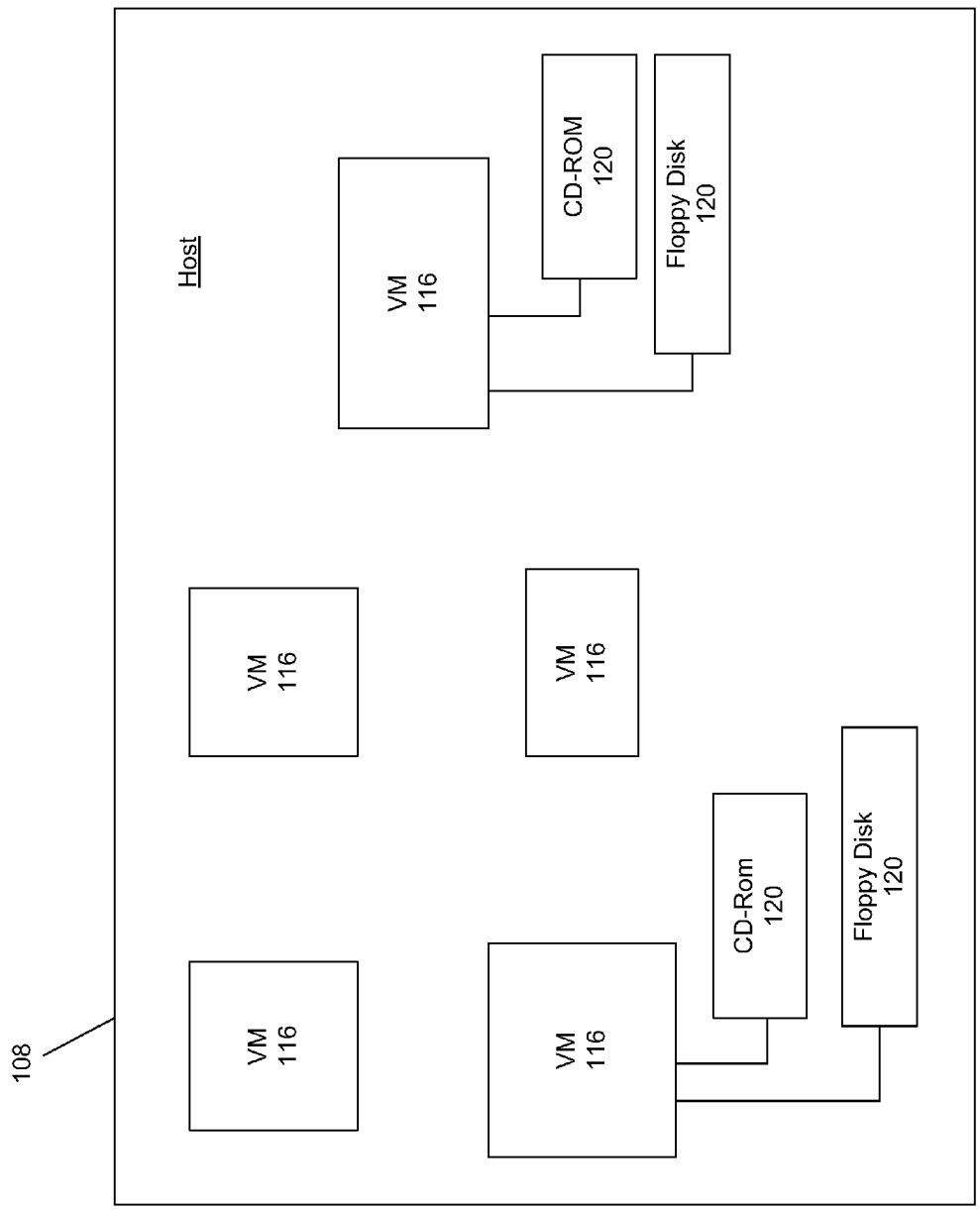
FIG. 1B schematically illustrates a host, configured with a virtual infrastructure, from the network of FIG. 1A.

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

For the purposes of the present disclosure, the phrase "A/B" means A or B. For the purposes of the present disclosure, the phrase "A and/or B" means "(A), (B), or (A and B)". For the purposes of the present disclosure, the phrase "at least one of A, B, and C" means "(A), (B), (C), (A and B), (A and C), (B and C), or (A, B and C)". For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As is known in the art, many network computing systems are configured using virtualization technology. Thus, many processing devices and/or processing systems may be virtually configured such that they operate as multiple independent systems. Generally, the systems are arranged to include at least one virtual machine, as well as one or more virtual objects that may function or operate in a manner similar to a physical peripheral device, for example, a CD Rom, a floppy disk drive, etc. The virtual machines generally function as the processor and/or controller within the virtual system. Each virtual system may include one or more virtual machines that may operate independently of each other and/or some of the virtual machines may run interdependently.

FIG. 1A schematically illustrates a network 100 that includes a virtual center (vCenter) 104 and a plurality of hosts 108. The vCenter 104 includes a component 112 that provides intra-partitioning of the hosts 108 into one or more virtual infrastructures. The vCenter is a VMware® server that is used to control one or more hosts 108. The component 112 may be in the form of software or firmware. In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present disclosure. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the disclosure.

With reference to FIG. 1B, a host 108 may be configured by the component 112 of FIG. 1A to include one or more virtual machines 116. Virtual objects 120 may also be configured and linked to one or more corresponding virtual machine(s) 116. As previously noted, each virtual machine 116, and any associated virtual objects 120, may operate independently, or may operate interdependently. Virtual objects 120 may also be associated with more than one VM 116. As examples of virtual objects, CD-ROMs and Floppy Disks are illustrated in FIG. 1B.

Figure 2:
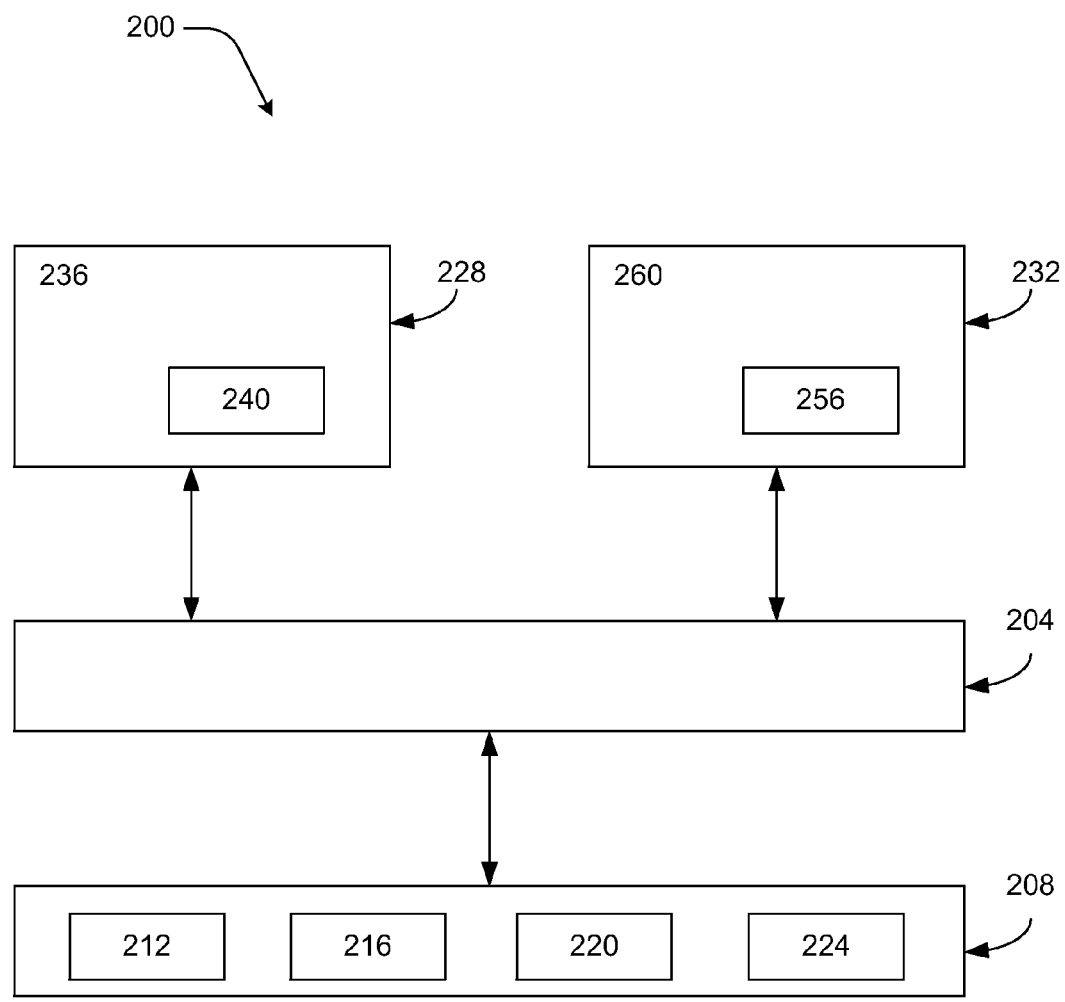
FIG. 2 schematically illustrates a platform utilizing parallel execution environments for the host of FIG. 1B.

More particularly, FIG. 2 illustrates a platform 200 wherein virtualization via, for example, VMware®, is utilized to provide parallel execution environments within the hosts 108. FIG. 2 illustrates one example for one host. In this exemplary embodiment, a management module, e.g., virtual machine monitor (VMM) 204, on the platform 200 may present multiple abstractions and/or views of the platform hardware 208, e.g., one or more processor(s) 212, network interface controller 216, storage 220, and/or memory 224, to the one or more independently operating execution environments, or "virtual machines (VMs)," e.g., first VM 228 and second VM 232. The first VM 228 may include an OS 236 and component 240, while the second VM 232 may include an OS 260 and component 256. The first VM 232 may be configured to execute code independently and securely isolated from the second VM 228 and may prevent components of the first VM 228 from performing operations that would alter, modify, read, or otherwise affect the components of the second VM 232. As previously discussed, the first VM 232 may be configured to execute code interdependently with the second VM 228 and may allow components of the first VM 228 to perform operations that would alter, modify, read, or otherwise affect the components of the second VM 232. While the platform 200 shows two VMs, other embodiments may employ any number of VMs.

The components operating in the first VM 228 and second VM 232 may each operate as if they were running on a dedicated computer rather than a virtual machine. That is, components 240 and 256 operating in the first VM 228 and second VM 232, respectively, may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

Thus, FIG. 1A illustrates a network 100 configured with a virtual infrastructure made up of at least one vCenter 104 and one or more hosts 108 that are configured to include virtual infrastructures made up of one or more virtual machines 116 and one or more virtual objects 120 as illustrated in FIG. 1B. As with any type of network, it is important to maintain the integrity of the network and its associated systems. Furthermore, various events may occur that can lead to problems within the network. Thus, it is important to monitor and manage the virtual infrastructure in order to detect events that occur that can affect the integrity and/or cause problems for the virtual infrastructure. Event occurrences include, for example, users logging into the virtual infrastructure, VMs 116 migrating from one host 108 to another host 108, VMs 116 starting up or shutting down, users modifying configurations of virtual objects or machines, etc. Another type of event that may occur includes a configuration change, wherein one or more aspects related to a configuration for the virtual infrastructure has been changed. Examples include modifications to resource allocations within a resource pool, changes to the virtualized hardware assigned to a VM, changes to the security policy of a virtual network, etc. Some event occurrences and configuration changes may cause alerts. In other instances, conditions, such as, for example the detection of snapshots that are older than a certain threshold, the detection of datastores with less than a certain threshold of free space, the detected failure of a Logical Unit Number (LUN) path, the detection of a failed vMotion, the detection of a newly created or deleted VM 116, etc, within the virtual infrastructure may also cause an alert. Another type of event includes a relationship change, which includes, for example, detection of a newly added object (CD-ROM 120) to a VM 116, a movement of a VM 116 from one host 108 to another host 108, the assignment of a host 108 to a cluster of hosts 108, etc. An alert may include some type of message to alert the system administrator as to the occurrence of the event, the configuration change and/or the conditions within the virtual infrastructure. Thus, as used herein, events generally refer to and include event occurrences, configuration changes and conditions that may cause an alert.

Accordingly, in accordance with various embodiments of the present invention, the network 100 includes a component 124 that is configured to monitor the virtual infrastructure by communicating with the vCenter 104 in order to detect events. Generally, the component 112 is configured maintain a system log (syslog) keeping record of various events that are detected. The component 124 is generally in the form of software or firmware. The component 124 may be located at a server that provides the vCenter 104 or may be located remotely at a different server.

Figure 3:
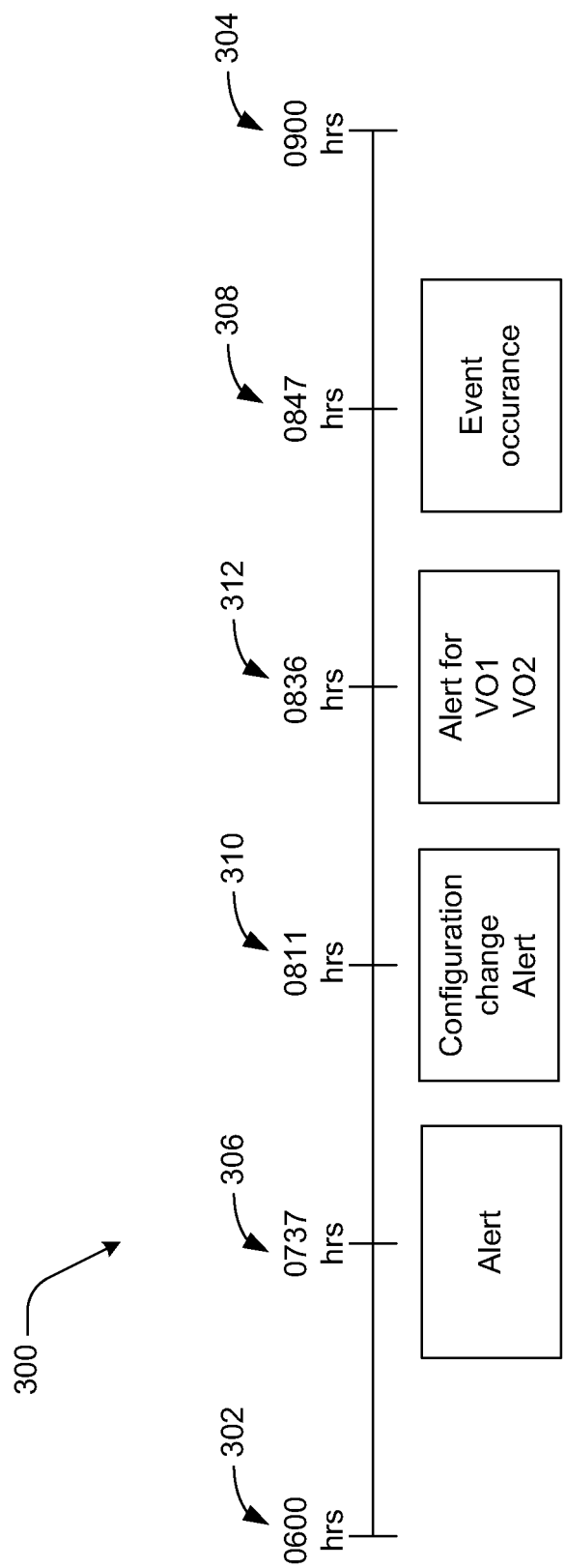
FIG. 3 illustrates a timeline for displaying detected events.

In order to address these event occurrences, configuration changes and conditions, it is helpful to see the various events in some type of timeframe. Accordingly, in accordance with the various embodiments of the present disclosure and with reference to FIG. 3, a timeline 300 is generated by the component 124 that displays various events such as event occurrences, configuration changes, relationship changes and/or conditions that lead to an alert. A system administrator may set the timeframe in which the timeline 300 displays the information. In the example of FIG. 3, the timeframe runs from 0600 hours (at 302) to 0900 hours (at 304). The timeline 300 may be generated automatically at predetermined instances in time, or may be generated manually. The timeline 300 may be displayed on a display device, such as a computer monitor (not shown) and/or may be printed onto a print medium by a printer (not shown). At 306, an alert is shown as having been generated at 0737 hours. At 308, an event occurrence is shown as having occurred at 0847 hours.

In accordance with various embodiments, if two or more event occurrences and/or configuration changes and/or conditions that lead to an alert occur simultaneously, then they may be associated and correlated with each other such that they will be displayed together along the timeline 300, thereby indicating their correlation. Such a correlation may lead to improved remedying of various situations. Thus, in the example of FIG. 3, a configuration change and an alert are shown as having occurred at 0811 hours. A system administrator viewing the timeline 300 would therefore realize that the configuration change resulted is the condition that caused the alert in the example of FIG. 3.

In accordance with various embodiments, the component 124 may be configured such that alerts arising from various occurrences or situations within the infrastructure are correlated with a first virtual object. The first virtual object may then be linked with a second virtual object to thereby indicate to a system administrator of the possible effects that the condition causing the alert with respect to the first virtual object may have on the second virtual object, even though the alert was generated for the first virtual object. Thus, at 312 an alert for a virtual object VO1 is illustrated at 0836 hours, along with an identification of virtual object VO2 to thereby inform the system administrator of the potential effect of the condition that caused the alert with respect to virtual object VO2.

Figure 4:
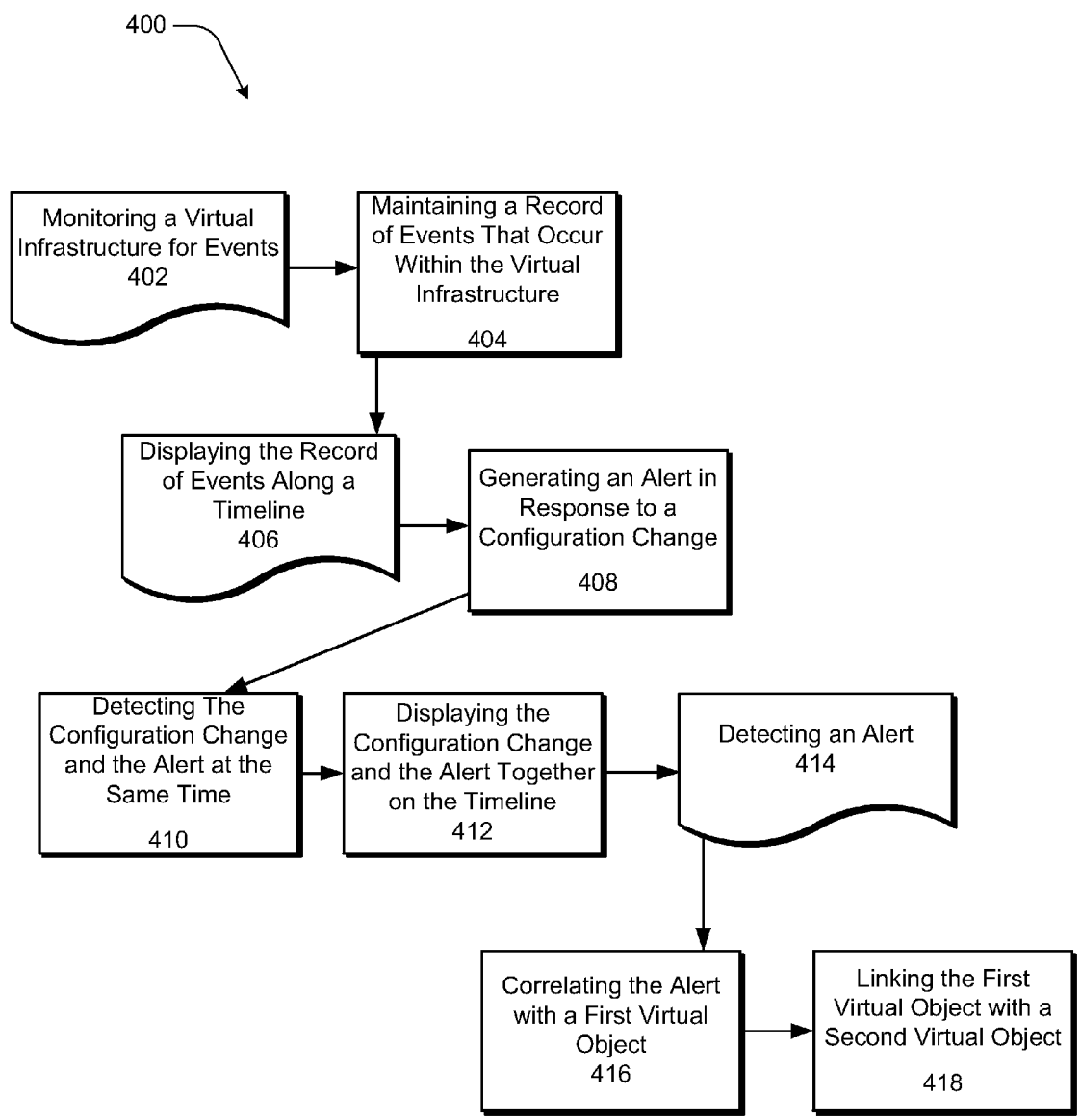
FIG. 4 is a flowchart illustrating some aspects of methods in accordance with the present disclosure.

Thus, with reference to FIG. 4, a method 400 in accordance with the present disclosure includes, at 402, monitoring a virtual infrastructure for events, wherein the events comprise event occurrences, configuration changes and conditions that cause alerts. The method 400 includes, at 404, maintaining a record of events that occur within the virtual infrastructure and, at 406, displaying the record of events along a timeline. The method 400 may include, at 408, generating an alert in response to a configuration. At 410, the method 400 may include detecting the configuration change and the alert at the same time and then at 412, displaying the detected configuration change and the detected alert together in an entry on the timeline. In accordance with various embodiments, the method 400 may also include, at 414, detecting an alert and, at 416, correlating the detected alert with a first virtual object of the virtual infrastructure. The method 400 may also include, at 418, linking the first virtual object with a second virtual object of the virtual infrastructure.

Figure 5:
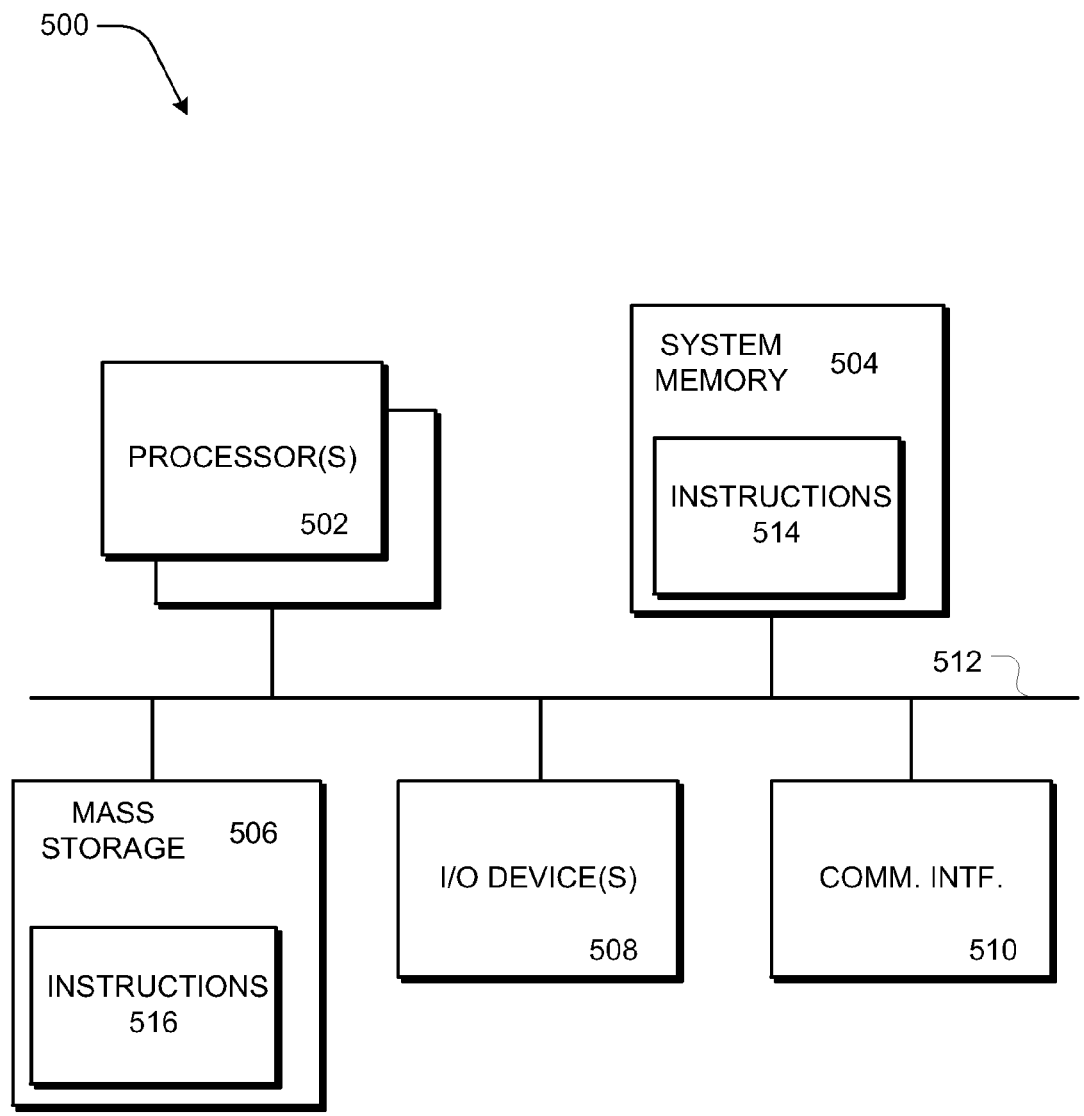
FIG. 5 schematically illustrates an example computer system suitable for use in association with a virtual infrastructure.

FIG. 5 illustrates an example computer system suitable for use in association with a virtual infrastructure, in accordance with various embodiments of this disclosure. As shown, computer system 500 may include one or more processors 502 and may include system memory 504. Additionally, computer system 500 may include mass storage 506 in the form of one or more devices (such as diskette, hard drive, compact disk (CD), flash memory, and so forth), input/output devices 508 (such as keyboard, cursor control and so forth) and communication interfaces 510 (such as network interface cards, modems and so forth). The elements may be coupled to each other via system bus 512, which may represent one or more buses. In the case where system bus 512 represents multiple buses, the multiple buses may be bridged by one or more bus bridges (not shown).

These elements each perform their conventional functions known in the art. In various embodiments, communication interfaces 510 may facilitate coupling of computing system 500 to a network, though which computing system 500 may be coupled to one or more data processing devices of a data processing environment and so forth, as necessary. In various embodiments, computing system 500 may at least be partially incorporated in such a data processing device. System memory 504 and mass storage 506 may be employed to store a working copy and a permanent copy of the programming instructions, illustrated as Instructions 514 and 516, respectively, for implementing various aspects of the one or more earlier described embodiments of the present disclosure. The permanent copy of the programming instructions may be loaded into mass storage 506 in the factory or in the field, through a distribution medium (not shown), or through communication interface 510 from, for example, a distribution server (not shown). The constitution of these elements 502-512 are known, and accordingly will not be further described. In alternate embodiments, part or all of the one or more modules may be implemented in hardware, for example, using one or more Application Specific Integrated Circuits (ASICs) instead.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium, wherein the plurality of instructions are adapted to cause one or more processors within a computing environment to perform a plurality of operations comprising monitoring a virtual infrastructure for events, the events comprising event occurrences, configuration changes, relationship changes, and conditions that produce an alert, maintaining a record of events that occur within the virtual infrastructure, and displaying the record of events along a timeline. In various embodiments, an article of manufacture may comprise a storage medium and a plurality of programming instructions stored in the storage medium and adapted to program, for example, computing system 500 to configure the computing system 500 to perform one or more operations of the method 400.

While the present invention has been described with respect to VMware®, the present invention is equally applicable to other types of virtualization systems and software and the present invention is not limited in this regard.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A computer-implemented method comprising:
   monitoring, by a computing device, a virtual infrastructure for events, the virtual infrastructure comprising a plurality of virtual machines and virtual objects hosted in a network comprising a plurality of hardware hosts, the events being monitored comprising configuration changes to the virtual objects;
   maintaining, in memory associated with the computing device, a record of events that occur within the virtual infrastructure;
   generating, by the computing device, an alert in response to a configuration change to a first virtual object in the virtual infrastructure;
   linking the first virtual object to a second virtual object in order to indicate that the configuration change to the first virtual object has a possible effect on the second virtual object; and
   displaying, on a display device, an individual entry on a timeline for the alert, the individual entry identifying the first virtual object together with the second virtual object, even though the alert was generated for the first virtual object, thereby informing a user that the configuration change to the first virtual object can affect the second virtual object, the individual entry being located adjacent to a time on the timeline at which the alert was generated.

2. The computer-implemented method of claim 1, further comprising:
   determining, by the computing device, a problem associated with the first virtual object;
   determining, by the computing device, an impact on the second virtual object based at least in part upon the determined problem or a potential solution; and
   fixing, by the computing device, the problem associated with the first virtual object based at least in part upon the determined impact,
   wherein the determining, by the computing device, the problem associated with the first virtual object is based upon the alert correlated with the first virtual object.

3. The computer-implemented method of claim 1, wherein the events being monitored further comprise virtual machines starting up or shutting down.

4. The computer-implemented method of claim 1, wherein the events being monitored further comprise one or more of modifications to resource allocations within a resource pool, changes to virtualized hardware assigned to a virtual machine, or changes to a security policy of a virtual network.

5. A system comprising:
   a virtual infrastructure implemented on a plurality of physical hosts, the virtual infrastructure comprising:
      a virtual control center;
      a plurality of virtual machines; and
      at least one virtual object; and
   a component configured to:
      monitor the virtual infrastructure for events, the events being monitored comprising configuration changes to the virtual objects;
      maintain a record of events that occur within the virtual infrastructure;
      generate an alert in response to a configuration change to a first virtual object;
      link the first virtual object to a second virtual object in order to indicate that the configuration change to the first virtual object has a possible effect on the second virtual object; and
      display an individual entry on a timeline for the alert, the individual entry identifying the first virtual object together with the second virtual object, even though the alert was generated for the first virtual object, thereby informing a user that the configuration change to the first virtual object can affect the second virtual object, the individual entry being located adjacent to a time on the timeline at which the alert was generated.

6. The system of claim 5, wherein the component is further configured to:
   determine a problem associated with the first virtual object;
   determine an impact on the second virtual object based at least in part upon the determined problem and/or a potential solution; and
   fix the problem associated with the first virtual object based at least in part upon the determined impact.

7. The system of claim 5, wherein the events being monitored further comprise virtual machines starting up or shutting down.

8. The system of claim 5, wherein the events being monitored further comprise one or more of modifications to resource allocations within a resource pool, changes to virtualized hardware assigned to a virtual machine, or changes to a security policy of a virtual network.

9. An article of manufacture comprising:
   a non-transitory storage medium; and
   a plurality of instructions stored thereon,
   wherein the plurality of instructions are adapted to cause a computing device, in response to execution by one or more processors of the computing device, to perform a plurality of operations comprising:
      monitoring a virtual infrastructure for events, the virtual infrastructure comprising a plurality of virtual machines and virtual objects hosted in a network comprising a plurality of hardware hosts, the events comprising configuration changes to the virtual objects;
      maintaining a record of events that occur within the virtual infrastructure;
      generating an alert in response to a configuration change to a first virtual object in the virtual infrastructure;
      linking the first virtual object to a second virtual object in order to indicate that the configuration change to the first virtual object has a possible effect on the second virtual object;
      displaying an individual entry on a timeline for the alert, the individual entry identifying the first virtual object together with the second virtual object, even though the alert was generated for the first virtual object, thereby informing a user that the configuration change to the first virtual object can affect the second virtual object, the individual entry being located adjacent to a time on the timeline at which the alert was generated.

10. The article of manufacture of claim 9, wherein the plurality of operations further comprise:
    determining a problem associated with the first virtual object;
    determining an impact on the second virtual object based at least in part upon the determined problem and/or a potential solution; and fixing the problem associated with the first virtual object based at least in part upon the determined impact.

11. The article of manufacture of claim 9, wherein the events being monitored further comprise virtual machines starting up or shutting down.

12. The article of manufacture of claim 9, wherein the events being monitored further comprise one or more of modifications to resource allocations within a resource pool, changes to virtualized hardware assigned to a virtual machine, or changes to a security policy of a virtual network.

* * * * *